United States Patent
Tsubata

(10) Patent No.: US 8,558,976 B2
(45) Date of Patent: Oct. 15, 2013

(54) COLOR FILTER SUBSTRATE AND LIQUID CRYSTAL DISPLAY DEVICE

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 105 days.

(21) Appl. No.: 13/497,260

(22) PCT Filed: May 26, 2010

(86) PCT No.: PCT/JP2010/058925
§ 371 (c)(1), (2), (4) Date: Mar. 21, 2012

(87) PCT Pub. No.: WO2011/045952
PCT Pub. Date: Apr. 21, 2011

(65) Prior Publication Data
US 2012/0169977 A1    Jul. 5, 2012

(30) Foreign Application Priority Data
Oct. 15, 2009   (JP) .................................. 2009-238465

(51) Int. Cl.
*G02F 1/1335* (2006.01)
*G02F 1/1339* (2006.01)

(52) U.S. Cl.
USPC .......................................... 349/106; 349/155

(58) Field of Classification Search
None
See application file for complete search history.

(56) References Cited

U.S. PATENT DOCUMENTS

| | | | |
|---|---|---|---|
| 5,815,232 A * | 9/1998 | Miyazaki et al. | 349/155 |
| 5,917,572 A | 6/1999 | Kurauchi et al. | |
| 6,110,641 A | 8/2000 | Trefonas, III et al. | |
| 6,577,374 B1 | 6/2003 | Nakata et al. | |
| 2004/0007752 A1 | 1/2004 | Nakata et al. | |
| 2004/0201814 A1 * | 10/2004 | Yamamoto | 349/156 |
| 2004/0223095 A1 * | 11/2004 | Tsubata et al. | 349/106 |
| 2005/0151909 A1 | 7/2005 | Yagi et al. | |

(Continued)

FOREIGN PATENT DOCUMENTS

| | | |
|---|---|---|
| JP | 05-165218 A | 7/1993 |
| JP | 08-248412 A | 9/1996 |

(Continued)

OTHER PUBLICATIONS

English translation of written opinion for PCT/JP2010/058925, mailing date Aug. 31, 2010.*

(Continued)

*Primary Examiner* — Mike Stahl
(74) *Attorney, Agent, or Firm* — Keating & Bennett, LLP

(57) ABSTRACT

The present invention provides a color filter substrate for preventing an electrical short circuit between an electrode and other members at a place upper than the colored transparent layers disposed in a stack, and further preventing electrical disconnection on colored transparent layers other than the colored transparent layers in a stack, in the case where colored transparent layers are disposed in a stack and an electrode is stacked over the entire surface. The color filter substrate of the present invention comprises:
colored transparent layers disposed side by side; and
colored transparent layers disposed in a stack,
wherein an electrode is disposed at a place upper than the colored transparent layers disposed side by side and an electrode is disposed at a place upper than the colored transparent layers disposed in a stack,
the colored transparent layers disposed in a stack include a colored transparent layer having a reverse tapered shape, and
the uppermost layer of the colored transparent layers disposed in a stack has a forward tapered shape.

10 Claims, 6 Drawing Sheets

(56) References Cited

U.S. PATENT DOCUMENTS

| | | | |
|---|---|---|---|
| 2009/0033841 A1* | 2/2009 | Li et al. | 349/106 |
| 2009/0257008 A1 | 10/2009 | Yagi et al. | |
| 2010/0165266 A1* | 7/2010 | Sakata et al. | 349/106 |
| 2010/0265439 A1 | 10/2010 | Ishitobi et al. | |

FOREIGN PATENT DOCUMENTS

| | | |
|---|---|---|
| JP | 09-120072 A | 5/1997 |
| JP | 11-242326 A | 9/1999 |
| JP | 2000-347022 A | 12/2000 |
| JP | 2001-100652 A | 4/2001 |
| JP | 2002-055349 A | 2/2002 |
| JP | 2003-161822 A | 6/2003 |
| JP | 2003-222879 A | 8/2003 |
| JP | 2005-208583 A | 8/2005 |
| JP | 2008-164858 A | 7/2008 |
| JP | 2008-191507 A | 8/2008 |
| JP | 2009-157341 A | 7/2009 |

OTHER PUBLICATIONS

Official Communication issued in International Patent Application No. PCT/JP2010/058925, mailed on Aug. 31, 2010.

* cited by examiner

COLOR FILTER SUBSTRATE AND LIQUID CRYSTAL DISPLAY DEVICE

TECHNICAL FIELD

The present invention relates to a color filter substrate and a liquid crystal display device. More specifically, the present invention relates to a color filter substrate including color filters disposed in a stack and a liquid crystal display device including such a color filter substrate.

BACKGROUND ART

A liquid crystal display (LCD) device includes a pair of substrates and a liquid crystal layer disposed between the substrates, and performs display in such away that an alignment state of liquid crystal molecules is changed by applying a voltage to the liquid crystal layer using electrodes formed in the substrates and a polarization state of light passing through the liquid crystal layer is changed. An LCD device performing color display has a color filter substrate including a plurality of color filters different in colors.

A pair of substrates of an LCD device is attached to each other with a sealing material. A distance (cell gap) between the pair of substrates is fixed with spacers. Examples of the spacers include a transparent bead. Beads may not be, however, uniformly dispersed, which may cause reduction in contrast. Therefore, alternatively, a stack of resin layers with a certain thickness may be used as a spacer. Color filters may be used as resin layers in a spacer (see, for example, Patent Document 1).

In an LCD device in which one substrate has a color filter layer and a counter electrode covering a spacer, which is formed of color filter layers; and the other substrate has a pixel electrode, a portion of the pixel electrode facing the spacer or a portion of the counter electrode at a place upper than the spacer may be removed, and an insulating film may be disposed between the counter electrode and the pixel electrode (see, for example, Patent Document 2). This enables reduction in the possibility of causing problems such that no voltage is applied to liquid crystals because of an electrical short circuit due to conduction between the counter electrode and the pixel electrode.

Patent Document 1: JP H09-120072 A
Patent Document 2: JP 2002-55349 A

DISCLOSURE OF THE INVENTION

The present inventor has conducted various investigations on a spacer formed by stacking colored transparent layers (hereinafter, also referred to as a multi-layer spacer) with a configuration for preventing an electrical short circuit. The inventor has found the following problems. Even if an insulating film is formed on a multi-layer spacer, the insulating film may be damaged by pressure from the multi-layer spacer to which external pressure is applied, when the durability of the insulating film is insufficient. Further, a fitting gap may be created to cause a short circuit (leak) between electrodes disposed on each of a pair of substrates. Thereby, display failure may be caused. Then, even if the short circuit between electrodes on a pair of substrates is prevented, a short circuit in a color filter substrate in a display portion may occur. A display device including such a color filter substrate cannot provide stable display.

The present invention has been made in view of the above-described state of the art. An object of the present invention is to provide a color filter substrate for preventing an electrical short circuit between an electrode and other members at the place upper than the colored transparent layers disposed in a stack, and further preventing electrical disconnection on colored transparent layers other than the colored transparent layers in a stack, in the case where colored transparent layers are disposed in a stack and an electrode is stacked over the entire surface.

The present inventor has conducted various investigations on other methods for preventing a short circuit between a pixel electrode and a common electrode in a color filter substrate including both colored transparent layers disposed in a stack and colored transparent layers not disposed in a stack. The present inventor has noted that a common electrode needs to be formed after formation of colored transparent layers not disposed in a stack, and therefore, when stacked on colored transparent layers included in a multi-layer spacer, a common electrode needs to be formed after the formation of the colored transparent layers.

The present inventor has also focused on a shape of each of colored transparent layers included in a multi-layer spacer, and has further found the following way. When at least one layer of the colored transparent layers included in a multi-layer spacer has a reverse tapered shape relative to a surface of a color filter substrate, even if a common electrode is formed after the formation of the colored transparent layers, the common electrode is likely to be disconnected at a side surface of the reverse tapered shape. Further, even if a short circuit is caused between a pixel electrode and a common electrode, the common electrode is disconnected at a part of a side wall of a multi-layer spacer. Therefore, conduction between the pixel electrode and the common electrode formed on a portion other than a multi-layer spacer can be prevented.

The present inventor has further intensively studied to find that if colored transparent layers included in a multi-layer spacer and colored transparent layers not disposed in a stack are simultaneously formed, an electrode formed in the colored transparent layers not disposed in a stack is also disconnected when at least one layer of the colored transparent layers included in a multi-layer spacer has a reverse tapered shape. The inventor further found the following way. In an area where the colored transparent layers are disposed side by side, corners (edges) of colored transparent layers each having a reverse tapered shape are covered by (1) forming a forward tapered colored transparent layer as an uppermost layer of colored transparent layers included in a multi-layer spacer or (2) forming a forward tapered light shieling layer on a colored transparent layer. Thus, a surface with irregularities including a forward tapered shape may be formed. As a result, an electrode is prevented from disconnection.

As a result, the present inventor admirably solved the above-described problems, leading to completion of the present invention.

That is, the present invention is a color filter substrate (hereinafter, also referred to as a first color filter substrate), comprising:
colored transparent layers disposed side by side; and
colored transparent layers disposed in a stack,
wherein an electrode is disposed at a place upper than the colored transparent layers disposed side by side and an electrode is disposed at a place upper than the colored transparent layers disposed in a stack,
the colored transparent layers disposed in a stack include a colored transparent layer having a reverse tapered shape, and
the uppermost layer of the colored transparent layers disposed in a stack has a forward tapered shape.

Further, the present invention is a color filter substrate (hereinafter, also referred to a second color filter substrate), comprising:
colored transparent layers disposed side by side; and
colored transparent layers disposed in a stack,
wherein an electrode is disposed at a place upper than the colored transparent layers disposed side by side and an electrode is disposed at a place upper than the colored transparent layers disposed in a stack,
the colored transparent layers disposed in a stack include a colored transparent layer having a reverse tapered shape, and
a light shielding layer having a forward tapered shape is disposed at a place upper than the colored transparent layers disposed in a stack.

The first and second color filter substrates of the present invention are described below.

Each of the first and second color filter substrates of the present invention includes colored transparent layers disposed side by side and colored transparent layers disposed in a stack. That is, each of the color filter substrates of the present invention has colored transparent layers arranged in two ways. Among the colored transparent layers arranged in two ways, colored transparent layers having the same color may be formed in the same process, which improves production efficiency. The term "colored transparent layer" means a layer through which only a specific wavelength component passes, and a color perceived by a viewer is different depending on the wavelength component passing through the layer.

In the first and second color filter substrates of the present invention, an electrode is disposed at a place upper than the colored transparent layers disposed side by side and an electrode is disposed at a place upper than the colored transparent layers disposed in a stack. Thereby, for example, each color can be controlled by changing the value of a voltage. However, in such a configuration, if a short circuit is created between the electrodes and other members whereby electrodes on the color filter substrate all become conductive, each color may not be finely controlled. According to the present invention, the conduction between the color filter substrate and other members can be prevented, which can eliminate such a problem.

In the first and second color filter substrates of the present invention, the colored transparent layers disposed in a stack include a colored transparent layer having a reverse tapered shape. If the colored transparent layers disposed in a stack include a colored transparent layer having a reverse tapered shape, attachment of an electrode material to side surfaces of the colored transparent layers disposed in a stack is prevented and high possibility of disconnection of an electrode can be achieved.

In the first and second color filter substrates of the present invention, the uppermost layer of the colored transparent layers disposed in a stack has a forward tapered shape. If the last-formed colored transparent layer of the colored transparent layers disposed in a stack has a forward tapered shape, the last-formed forward tapered colored transparent layer can cover edges of reverse tapered colored transparent layers disposed side by side formed before the formation of the last-formed layer. Thus, a surface of an area in which an electrode is to be formed is made to have irregularities including a forward tapered shape.

In the second color filter substrate of the present invention, a light shielding layer having a forward tapered shape is disposed at a place upper than the colored transparent layers disposed in a stack. The forward tapered light shielding layer disposed on the colored transparent layers disposed in a stack can cover edges of reverse tapered colored transparent layers disposed side by side, regardless of the kinds of colors of the colored transparent layers with a reverse tapered shape or regardless of the number of the colored transparent layers with a reverse tapered shape. Thus, a surface on which an electrode is to be formed is made to have irregularities including a forward tapered shape.

The configurations of the first and second color filter substrates of the present invention are not especially limited as long as such components are essentially included. The first and second color filter substrates may or may not include other components.

Preferred embodiments of the first and second color filter substrates of the present invention are described below.

In the first color filter substrate of the present invention, the colored transparent layers disposed in a stack, other than the uppermost layer, each preferably have a reverse tapered shape. In the colored transparent layers disposed in a stack, the higher the proportion of reverse tapered colored transparent layers is, the higher the possibility of disconnection is. Therefore, in the first color filter substrate of the present invention, the number of the reverse tapered colored transparent layers is preferably large.

In the second color filter substrate of the present invention, each of the colored transparent layers disposed in a stack preferably has a reverse tapered shape. In the colored transparent layers disposed in a stack, the higher the proportion of reverse tapered colored transparent layers is, the higher the possibility of disconnection is. Therefore, in the second color filter substrate of the present invention, the number of the reverse tapered colored transparent layers is preferably large.

The colored transparent layers disposed side by side are preferably arranged in a stripe pattern or in a dot pattern. The stripe pattern is formed by a plurality of colored lines. Each of the colored lines is formed by the same colored transparent layers which are linearly arranged in a column direction or a row direction. The dot pattern is formed by colored transparent layers in dots. The colored transparent layers are separately arranged so that the same colored transparent layers are not adjacent to each other in a column direction and a row direction.

Since the colored transparent layers in a dot pattern are spaced apart from each other, the possibility of disconnection is higher in an area including the colored transparent layers in a dot pattern than in an area including the colored transparent layer in a stripe pattern. Therefore, the present invention is particularly effective for the dot pattern.

Edges of the colored transparent layers may be covered more easily by a light shielding layer formed after the formation of the colored transparent layers than by a light shielding layer formed before the formation of the colored transparent layers.

The colored transparent layer having a reverse tapered shape preferably contains an ultraviolet absorption material. If the reverse tapered colored transparent layer contains an ultraviolet absorption material, regions which ultraviolet radiation reaches can be controlled by adjustment of the amount of the ultraviolet absorption material contained in the layer in a patterning process. Thereby, the patterning can be easily performed.

The colored transparent layer having a reverse tapered shape preferably includes a reverse tapered portion and a forward tapered portion, the reverse tapered portion being located at a place upper than the forward tapered portion. In the first and second color filter substrates of the present invention, the reverse tapered colored transparent layer may consist of a reverse tapered shape or may include a reverse tapered portion and a reverse tapered portion. As long as the forward tapered portion is located at a lower portion being located at a place lower than the reverse tapered portion, effects of disconnection of a common electrode can be obtained. Therefore, such a reverse tapered shape enables easy patterning even if it is difficult to form a colored transparent layer having an exact reverse tapered shape.

The present invention is also a liquid crystal display device, comprising:

the first and second color filter substrates of the present invention;

a counter substrate; and a liquid crystal layer disposed between the color filter substrate and the counter substrate. According to the color filter substrates of the present invention, a short circuit between the color filter substrate and the counter substrate may be prevented, and the functions of the color filter substrates may be sufficiently provided.

The configuration of the LCD device of the present invention is not especially limited as long as such components are essentially included. The LCD device may or may not include other components.

The colored transparent layers disposed side by side preferably constitute a display portion of the liquid crystal display device, and the colored transparent layers disposed in a stack preferably constitute a spacer portion of the liquid crystal display device. In such a configuration, the colored transparent layers disposed in a stack may be used as a multi-layer spacer and conduction between an electrode on the multi-layer spacer and an electrode in the counter substrate can be prevented. Further, an electrode in a display portion can be prevented from disconnection, which suppresses display failure and achieves stable display quality.

EFFECT OF THE INVENTION

According to the color filter substrate of the present invention, a short circuit between the substrate and other members can be prevented and an area originally used as a color filter can be sufficiently worked. Further, according to the LCD device of the present invention, a short circuit between a pair of substrates that face each other through a multi-layer spacer is prevented and stable display quality can be secured in a display portion.

BEST MODE FOR CARRYING OUT THE INVENTION

The present invention is described in more detail below with reference to Embodiments, but not limited only thereto.

As used herein, the term "upper" means "in a direction of the stacking order of the colored transparent layers."

As used herein, the term "reverse" in the phrase "reverse tapered shape" means the "reverse" relative to the stacking order for forming the colored transparent layers disposed in a stack. In other words, the "reverse tapered shape" is a shape in which the width increases in the height direction.

As used herein, the term "forward" in the phrase "forward tapered shape" means the "forward" relative to the stacking order for forming the colored transparent layers disposed in a stack. In other words, the "forward tapered shape" is a shape in which the width decreases in the height direction.

Embodiment 1

Figure 1:
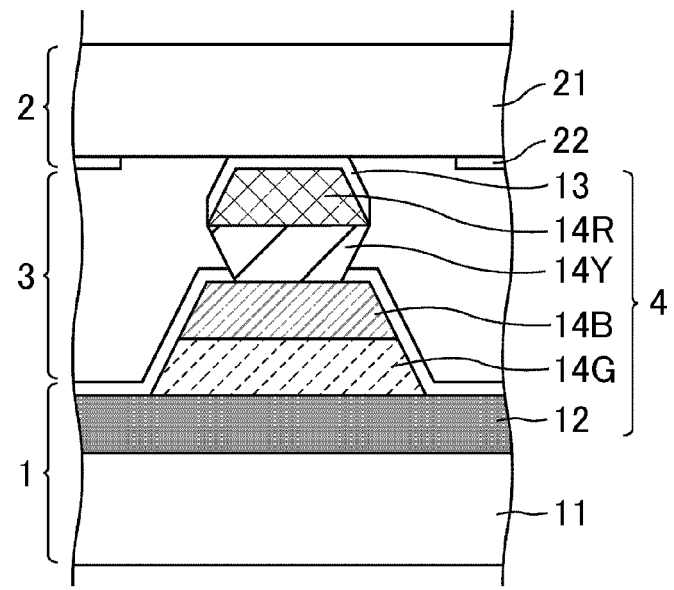
FIG. 1 is a schematic cross-sectional view of a spacer portion of a liquid crystal display device of Embodiment 1.

Embodiment 1 is one embodiment of a liquid crystal display device including a first color filter substrate of the present invention. FIG. 1 is a schematic cross-sectional view of a spacer portion of a liquid crystal display (hereinafter, referred to as LCD) device of Embodiment 1. As shown in FIG. 1, the LCD device of Embodiment 1 has a configuration where a liquid crystal layer 3 is disposed between a color filter substrate 1 and an array substrate 2, and a multi-layer spacer 4 is disposed between the color filter substrate 1 and the array substrate 2, as a member for fixing a distance (cell gap) therebetween. The multi-layer spacer 4 is formed in the color filter substrate 1.

The color filter substrate 1 and the array substrate 2 mainly include insulating substrates 11 and 21, respectively. The substrates 11 and 21 are made from glass, resins, or the like.

The multi-layer spacer 4 includes a black matrix (light shielding layer) 12, a green color filter (colored transparent layer) 14G, a blue color filter (colored transparent layer) 14B, a yellow color filter (colored transparent layer) 14Y, a red color filter (colored transparent layer) 14R, and a common electrode 13, which are stacked in this order when viewed from the insulating substrate 11. Accordingly, in Embodiment 1, the common electrode 13 is disposed at a place upper than the color filters disposed in a stack.

In the LCD device of Embodiment 1, the color filter substrate 1 is provided with the common electrode 13, and the array substrate 2 is provided with a pixel electrode 22. These electrodes create an electric filed in the liquid crystal layer 3, which changes alignment of liquid crystal molecules in the liquid crystal layer 3. Such alignment change enables switching on and off of the display of the LCD device. In Embodiment 1, the pixel electrode 22 in the array substrate 2 and the common electrode 13 in the color filter substrate 1 are spaced apart from each other so as not to short-circuit. An alignment film, not shown in Figs, is formed on the pixel electrode 22 in the array substrate 2, and an alignment film, not shown in Figs, is formed on the common electrode 13 in the color filter substrate 1. The alignment films are films for defining an initial inclination of liquid crystal molecules, and the alignment characteristics of the films is provided by a rubbing process, a photo-alignment process, or the like.

Of color filters included in the multi-layer spacer 4, the yellow color filter 14Y has a reverse tapered shape and each of the color filters 14G, 14B, and 14R has a forward tapered shape. In Embodiment 1, the uppermost layer of the color filters disposed in a stack is the red color filter 14R with a forward tapered shape.

The common electrode 13 is formed almost entirely on a surface of the color filter substrate 1 and an upper surface and a side surface of the multi-layer spacer 4 on the color filter substrate 1. No common electrode is formed on a side surface of the reverse tapered yellow color filter 14Y. This is because the upper surface of the reverse tapered color filter 14Y has an area larger than that of the bottom surface thereof, which prevents the common electrode 13 from being formed on the side surface of the color filter 14Y in stacking the common electrode 13.

In such a configuration, for example, a fitting gap may be created when the multi-layer spacer is pressed by external pressure applied to the LCD device. Thereby, a short circuit (leak) may be caused between the common electrode 13 of the multi-layer spacer 4 and the pixel electrode 22 of the array substrate 2. However, in the configuration of the multi-layer spacer 4 in accordance with Embodiment 1, the common electrode 13 attached to the multi-layer spacer 4 is disconnected, which interrupts the conduction between the pixel electrode 22 and the common electrode 13 at a side wall of the multi-layer spacer 4. Thus, no current arrives at the common electrode 13 on color filters used in a display portion, and therefore original functions of a color filter substrate are maintained.

Figure 2:
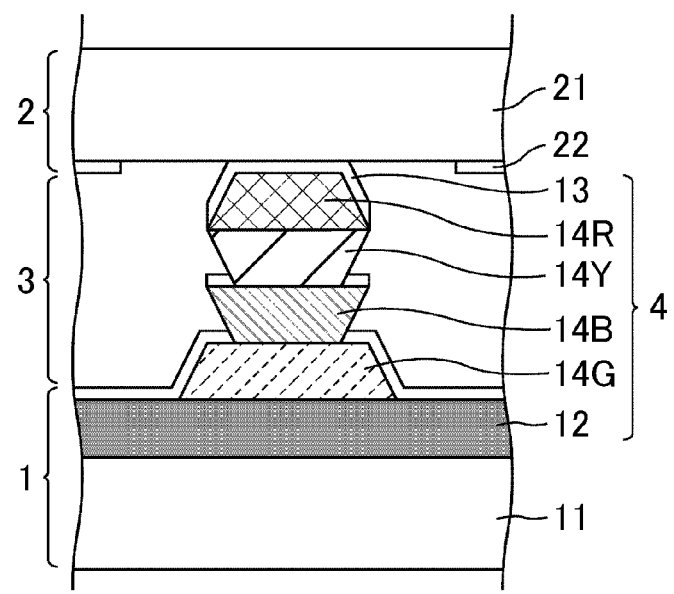
FIG. 2 is a schematic cross-sectional view of a spacer portion of variation 1 of the liquid crystal display device of Embodiment 1.
Figure 3:
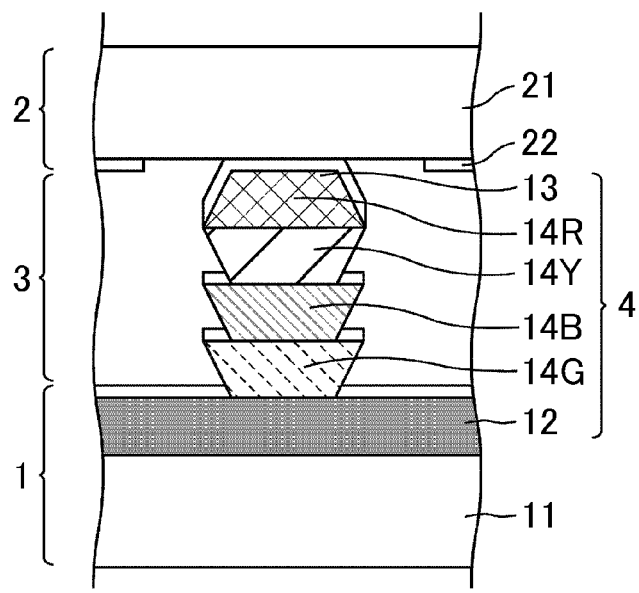
FIG. 3 is a schematic cross-sectional view of a spacer portion of variation 2 of the liquid crystal display device of Embodiment 1.

FIG. 1 shows an embodiment in which only the yellow color filter 14Y of color filters included in a multi-layer spacer has a reverse tapered shape. In Embodiment 1, as shown in FIG. 2, in addition to the yellow color filter 14Y, the blue color filter 14B has a reverse tapered shape, and as shown in FIG. 3, the remaining color filters 14G, 14B, and 14Y each have a reverse tapered shape. Thereby, high possibility of disconnection of a common electrode formed on a side wall of the multi-layer spacer 4 can be achieved. FIG. 2 is a schematic cross-sectional view of a spacer portion of variation 1 of the LCD device of Embodiment 1. FIG. 3 is a schematic cross-sectional view of a spacer portion of variation 2 of the LCD device of Embodiment 1.

Figure 4:
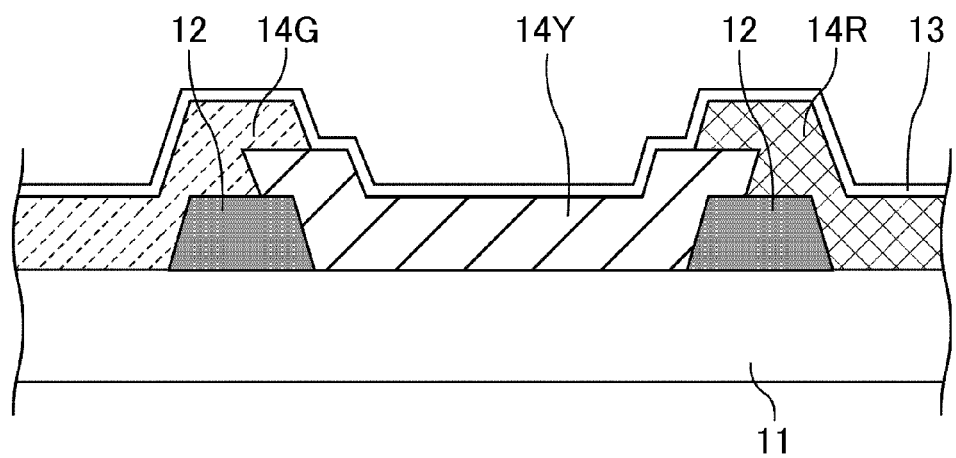
FIG. 4 is a schematic cross-sectional view of a display portion of the liquid crystal display device of Embodiment 1.

FIG. 4 is a schematic cross-sectional view of a display portion of the LCD device of Embodiment 1. As shown in FIG. 4, in a display portion, a green color filter 14G, a yellow color filter, and a red color filter 14R are arranged side by side on an insulating substrate 11. In Embodiment 1, a blue color filter 14B, not shown in FIG. 4, is also disposed together with the other filters side by side. The color filters 14R, 14G, 14B, and 14Y are members for creating colored display light from visible light in a specific wavelength band passing through the members. Desired color display can be created by combination of the color filters. That is, an area where the color filters 14R, 14G, 14B, and 14Y are disposed side by side is used as a display portion. The kinds of colors of the color filters in Embodiment 1 are not limited, and the colors may include, for example, red, green, blue, and white. Further, the number of colors of the color filters need not to be four, and may be three or five or more.

A black matrix (light shielding layers) 12 is disposed at a space made by the color filters 14R, 14G, 14B, and 14Y. Such a black matrix 12 prevents light leakage and color mixing when light passes through the color filter substrate 1.

The color filters 14R, 14G, 14B, and 14Y, the black matrix 12, and a common electrode 13, in the display portion, are made of the same materials as those of color filters 14R, 14G, 14B, and 14Y, black matrix 12, and a common electrode 13, in a spacer portion, respectively. The color filters 14R, 14G, 14B, and 14Y in the display portion and the color filters 14R, 14G, 14B, and 14Y in the spacer portion are formed in the same process; the black matrix 12 in the display portion and the black matrix 12 in the spacer portion are formed in the same process; and the common electrode 13 in the display portion and the common electrode 13 in the spacer portion are formed in the same process. Thereby, efficiency of the production process can be improved.

According to such a process, the yellow color filter 14Y included in the display portion is made into a reverse tapered shape similarly to the yellow color filter 14Y included in the multi-layer spacer. Such a configuration may cause disconnection of the common electrode 13 in the display portion. However, since the green color filter 14G and the red color filter 14R each having a forward tapered shape and adjoining the color filter 14Y partly overlap with corners (edges) of the color filter 14Y with a reverse tapered shape after the formation of the yellow color filter 14Y, irregularities including a forward tapered shape are created, and the common electrode 13 is formed on the irregularities. Therefore, according to Embodiment 1, disconnection of the common electrode 13 can be prevented and stable display can be achieved.

Figure 5:
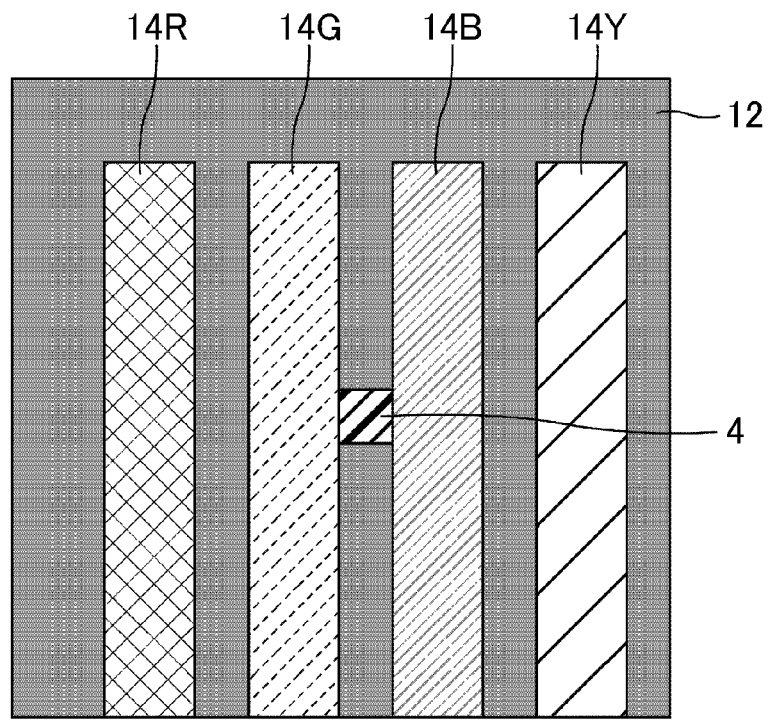
FIG. 5 is a schematic plan view of a color filter substrate of the liquid crystal display device of Embodiment 1.

FIG. 5 is a schematic plan view of a color filter substrate of the LCD device of Embodiment 1. As shown in FIG. 5, the color filter substrate 1 according to Embodiment 1 includes, as color filters for display, four differently colored filters: a red color filter 14R, a green color filter 14G, a blue color filter 14B, and a yellow color filter 14Y. The color filters 14R, 14G, 14B, and 14Y are arranged in a stripe pattern. The color filters 14R, 14G, 14B, and 14Y are formed in straight lines in a column direction regardless of a configuration of a pixel, and form stripes.

A black matrix (light shielding layer) 12 is disposed at a space made by the color filters 14R, 14G, 14B, and 14Y, and form a lattice pattern. The multi-layer spacer 4 is formed between the green color filter 14G and the blue color filter 14B.

Next, the array substrate 2 is explained.

The array substrate 2 of the LCD device of Embodiment 1 includes on the insulating substrate 21: gate lines extending in a row direction; source lines extending in a column direction; and thin film transistors (TFT). Each of the TFTs is formed at a position in the vicinity of an intersection of a gate line and a source line. Such an array substrate 2 may be an active matrix substrate for driving pixel electrodes 22, each of which is disposed in an area surrounded by gate wirings and source lines, by using switching characteristics of the TFTs. Each of the TFTs is a three terminal field-effect transistor and includes a semiconductor layer. If scanning signals are supplied to the TFTs through the gate lines, picture signals transmitted through the source lines are supplied to the pixel electrodes 22 through the TFTs. Therefore, according to an active matrix system, display can be controlled for every pixel.

In this case, the gate lines, the source lines, the pixel electrodes 22 are arranged in different layers through an insulating layer.

Since the color filters 14R, 14G, 14B, and 14Y disposed in a stripe pattern extend in a column direction, the gate lines extending in a row direction are perpendicular to the color filters 14R, 14G, 14B, and 14Y disposed in a stripe pattern. The black matrix 12 in the color filter substrate overlaps with the source lines and part of the gate lines in the array substrate 2.

Examples of the method for forming the color filters 14R, 14G, 14B, and 14Y and the black matrix 12 include, but not particularly limited to, a method (a) including forming a photosensitive resin film by applying a photosensitive resin material on an insulating substrate 11 with a coater, and patterning the photosensitive resin film by photolithography; and a method (b) including forming a photosensitive resin film by transferring a photosensitive dry film formed on a base material on an insulating substrate 11, and patterning the photosensitive resin film by photolithography.

The color filters can be formed in a forward tapered shape by standard photolithography. On the other hand, a method for forming color filters each having a reverse tapered shape by photolithography needs to be contrived. An example of the method is described below.

A negative photosensitive resin comprising an ultraviolet (UV) absorbing material is prepared as a material made into reverse tapered color filters by a patterning process. In such a negative photosensitive resin, the concentration of the UV absorbing material is adjusted so as to be increased in a deeper portion of the resin, which allows reduction in an amount of light that reaches a deeper portion of the resin during exposure.

Thereby, a photo-crosslinking reaction hardly proceeds at the deeper portion of the resin, which allows the deeper portion to easily dissolve with a developer. Accordingly, the color filters can be formed in a reverse tapered shape by a patterning process.

The above-described method is also applicable for adjusting a pigment concentration of a black matrix. For example, the concentration of a black pigment (carbon black) included in a black matrix is adjusted so as to be increased at a deeper portion of the black matrix. Thereby, light hardly reaches a deeper portion of the black matrix, which allows the deeper portion to be dissolved in a developer during development. Accordingly, a reverse tapered black matrix can be formed.

If the color filters each having a reverse tapered shape are formed by such a method, in a spacer portion, the width of an upper surface of a color filter with a reverse tapered shape is equal to or smaller than that of an upper surface of a color filter with a forward tapered shape. This is because, since the color filters are patterned after sequentially stacked, the width of the upper surface of the reverse tapered shape does not exceed that of the upper surface of the forward tapered shape in the case that the color filters are stacked in a different timing.

When the color filters each having a reverse tapered shape are formed by a patterning process, a material for color filters to be formed in a reverse tapered shape in an upper layer is applied to an upper surface of color filters to be formed in a lower layer. Therefore, color filters which are almost the same in width of the upper surface of color filters each having a reverse tapered shape are stacked.

Accordingly, as shown in FIGS. 1 to 3, the color filters disposed in a stack have irregularities at their side walls. More specifically, (i) at a portion where a color filter having a reverse tapered shape and a color filter having a forward tapered shape are stacked in this order, the width of the upper surface of the color filter having a forward tapered shape is smaller than that of the upper surface of the color filter having a reverse tapered shape; (ii) at a portion where a color filter having a forward tapered shape and a color filter having a reverse tapered shape are stacked in this order, the width of the lower surface of the color filter having a reverse tapered shape is smaller than that of the upper surface of the color filter having a forward tapered shape; (iii) at a portion where color filters each having a forward tapered shape are stacked, the width of the upper surface of the forward tapered color filter in an upper layer is smaller than that of the upper surface of the forward tapered color filter in a lower layer; and (iv) at a portion where color filters each having a reverse tapered shape are stacked, the width of the upper surface of the reverse tapered color filter in a lower layer is smaller than that of the lower surface of the reverse tapered color filter in an upper layer.

The common electrode 13 is formed, for example, by a method including forming a conductive film by applying a conductive material to the insulating substrate 11 using a sputtering device or a coater, and patterning the conductive film by photolithography.

Examples of materials of the color filters 14R, 14G, 14B, and 14Y include resin materials such as photosensitive resins in which pigments of the respective colors of the filters are dispersed. Examples of a material of the black matrix 12 include resin materials such as photosensitive resins in which a black pigment is dispersed and black metal materials such as chromium. Examples of a material of the common electrode 13 include translucent metal oxides such as indium tin oxide (ITO) and indium zinc oxide (IZO).

Embodiment 2

Embodiment 2 is one embodiment of a liquid crystal display device including a second color filter substrate of the present invention. The LCD device of Embodiment 2 has the same configuration as that of Embodiment 1 except for the configuration of the color filter substrate in a spacer portion and the configuration of the color filter substrate in a display portion.

Figure 6:
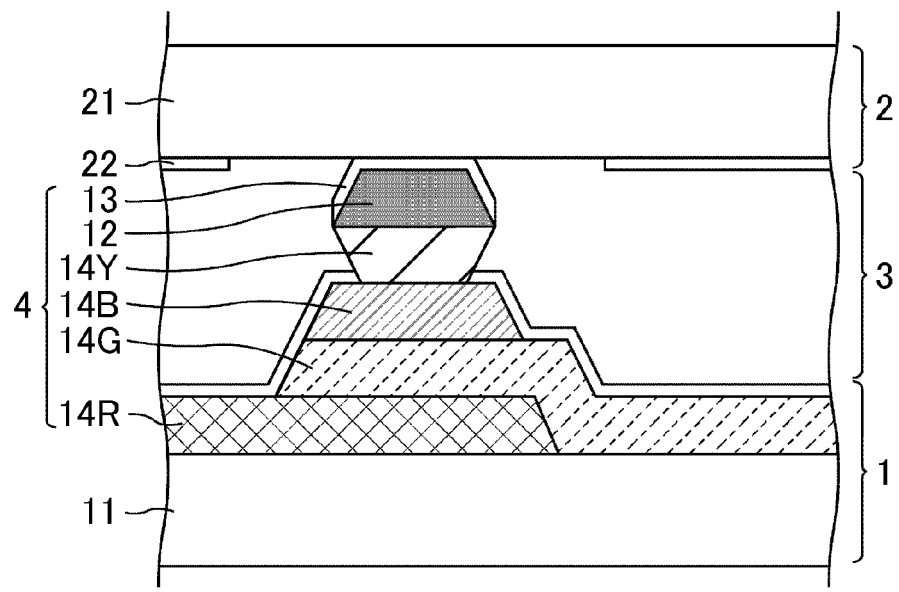
FIG. 6 is a schematic cross-sectional view of a spacer portion of a liquid crystal display device of Embodiment 2.

FIG. 6 is a schematic cross-sectional view of a spacer portion of an LCD device of Embodiment 2. As shown in FIG. 6, the LCD device of Embodiment 2 has a configuration where a liquid crystal layer 3 is disposed between a color filter substrate 1 and an array substrate 2, and a multi-layer spacer 4 is disposed between the color filter substrate 1 and the array substrate 2 as a member for fixing a distance (cell gap) therebetween. The multi-layer spacer 4 is formed in the color filter substrate 1. The top of the multi-layer spacer 4 is in contact with the array substrate 1.

The multi-layer spacer 4 in Embodiment 2 includes a red color filter (colored transparent layer) 14R, a green color filter (colored transparent layer) 14G, a blue color filter (colored transparent layer) 14B, a yellow color filter (colored transparent layer) 14Y, a black matrix (light shielding layer) 12, and a common electrode 13, which are stacked in this order when viewed from the insulating substrate 11. Accordingly, in Embodiment 2, the light shielding layer 12 is disposed at a place upper than the color filters 14R, 14G, 14B, and 14Y disposed in a stack, and the common electrode 13 is disposed at a place upper than the light shielding layer 12.

Figure 7:
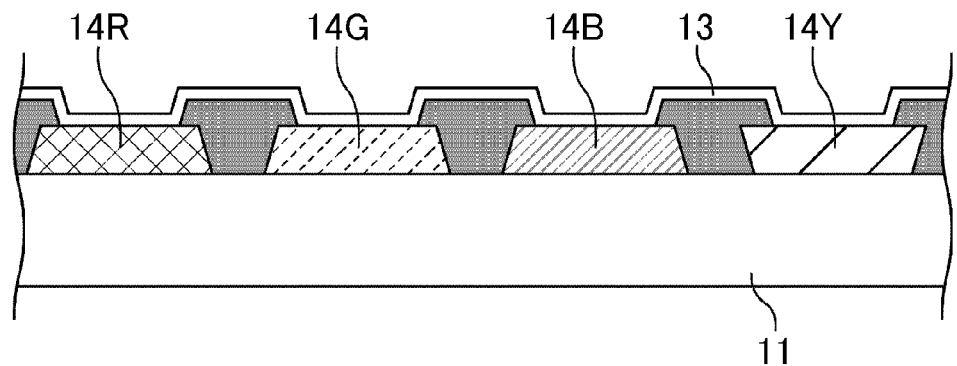
FIG. 7 is a schematic cross-sectional view of a display portion of the liquid crystal display device of Embodiment 2.

FIG. 7 is a schematic cross-sectional view of a display portion of the LCD device of Embodiment 2. As shown in FIG. 7, a red color filter 14R, a green color filter 14G, a blue color filter 14B, and a yellow color filter 14Y are arranged side by side on the insulating substrate 11 in the display portion.

A black matrix (light shielding layer) is disposed at a space made by the color filters 14R, 14G, 14B, and 14Y. Such black matrix 12 prevents light leakage and color mixing when light passes through the color filter substrate 1.

The color filters 14R, 14G, 14B, and 14Y, a black matrix 12, and a common electrode 13, in the display portion, are made of the same materials as those of the color filters 14R, 14G, 14B, and 14Y, the black matrix 12, and the common electrode 13, included in the multi-layer spacer 4, respectively. The color filters 14R, 14G, 14B, and 14Y in the display portion and the color filters 14R, 14G, 14B, and 14Y in the spacer portion are formed in the same step; the black matrix 12 in the display portion and the black matrix 12 in the spacer portion are formed in the same step; and the common electrode 13 in the display portion and the common electrode 13 in the spacer portion are formed in the same step, whereby efficiency of a production process can be improved.

The yellow color filter 14Y in the display portion has a reverse tapered shape similarly to the yellow color filter 14Y in the spacer portion. Such a configuration in accordance with Embodiment 2 may cause disconnection of the common electrode 13 in the display portion. However, the black matrix 12 overlaps with corners (edges) of the reverse tapered yellow color filter 14Y. In Embodiment 2, since the black matrix is formed after the formation of the color filters, and each of these has a forward tapered shape, irregularities including a forward tapered shape are created, and the common electrode 13 is formed on the irregularities. Therefore, according to such an embodiment, disconnection of the common electrode 13 can be prevented and stable display can be achieved.

Figure 8:
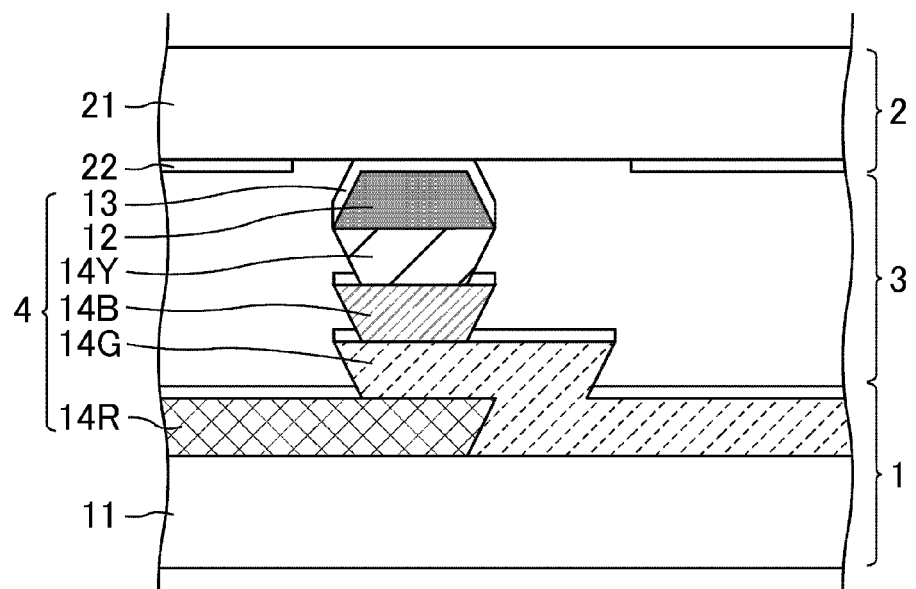
FIG. 8 is a schematic cross-sectional view of a spacer portion of a variation of the liquid crystal display device of Embodiment 2.
Figure 9:
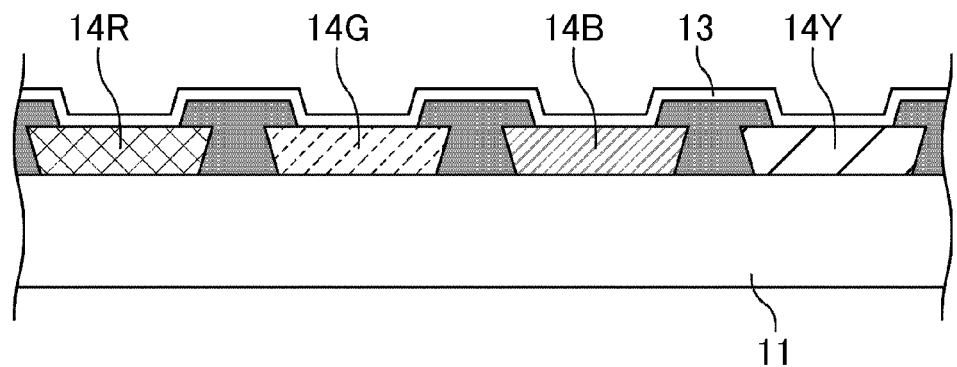
FIG. 9 is a schematic cross-sectional view of a display portion of a variation of the liquid crystal display device of Embodiment 2.

FIG. 6 shows an embodiment in which only the yellow color filter 14Y of the color filters included in a multi-layer spacer has a reverse tapered shape. In Embodiment 2, as shown in FIG. 8, the color filters 14R, 14G, 14B, and 14Y disposed in a stack each have a reverse tapered shape. Such an embodiment achieves high possibility of disconnection of the common electrode formed on a side wall of the multi-layer spacer 4. FIG. 8 is a schematic cross-sectional view of a spacer portion of a variation of the LCD device of Embodiment 2. FIG. 9 is a schematic cross-sectional view of a display portion of a variation of the LCD device of Embodiment 2.

Figure 10:
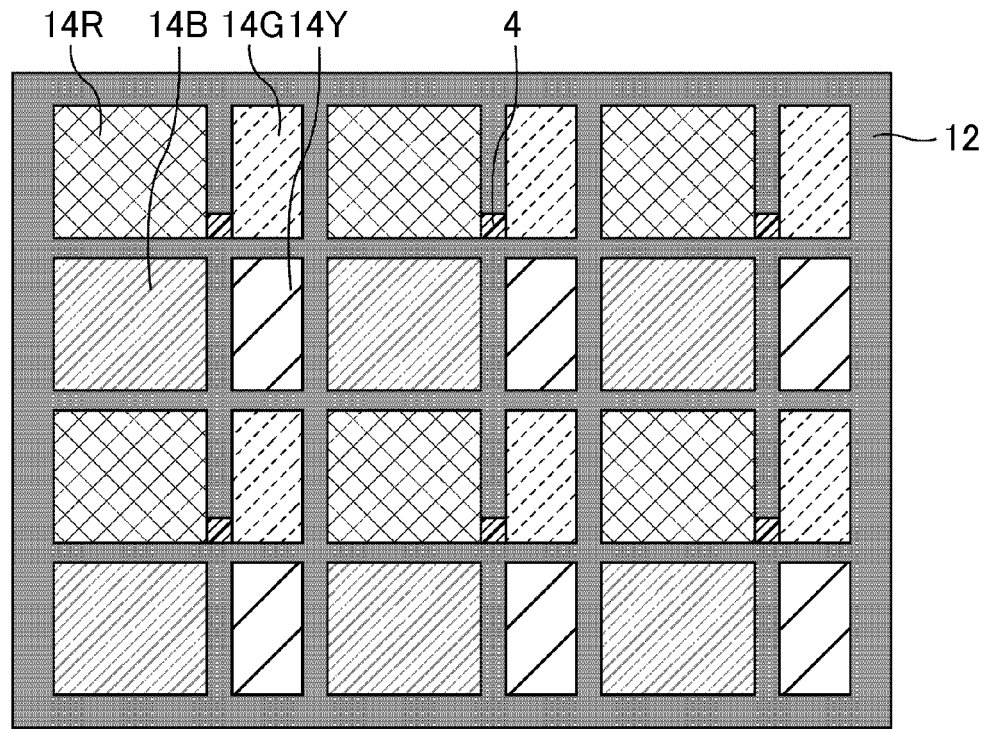
FIG. 10 is a schematic plan view of a color filter substrate of the liquid crystal display device of Embodiment 2.

FIG. 10 is a schematic plan view of a color filter substrate of the LCD device of Embodiment 2. As shown in FIG. 10, the color filter substrate 1 of the LCD device of Embodiment 2 includes four differently colored filters of a red color filter 14R, a green color filter 14G, a blue color filter 14B, and a yellow color filter 14Y, in the display portion. The color filters 14R, 14G, 14B, and 14Y are separated by the black matrix 12 to form a dot pattern. Color filters adjacent to each other in a column direction have different colors and color filters adjacent to each other in a row direction have different colors. As shown in FIG. 10, areas of the differently colored filters may be different in the colors. FIG. 10 shows an embodiment in which areas of the green color filter 14G and the yellow color filter 14Y are smaller than those of the red color filter 14R and the blue color filter 14B.

The black matrix 12 is disposed at a space made by the color filters 14R, 14G, and 14B and 14Y, and entirely forms a lattice pattern. The multi-layer spacer 4 is disposed between the red color filter 14R and the green color filter 14G.

Embodiment 3

Embodiment 3 is one embodiment of a liquid crystal display device including a first color filter substrate of the present invention or a second color filter substrate of the present invention. The LCD device of Embodiment 3 has the same configuration as that of Embodiments 1 or 2 except for the configuration of the color filter substrate in a spacer portion and the configuration of the color filter in a display portion.

Figure 11:
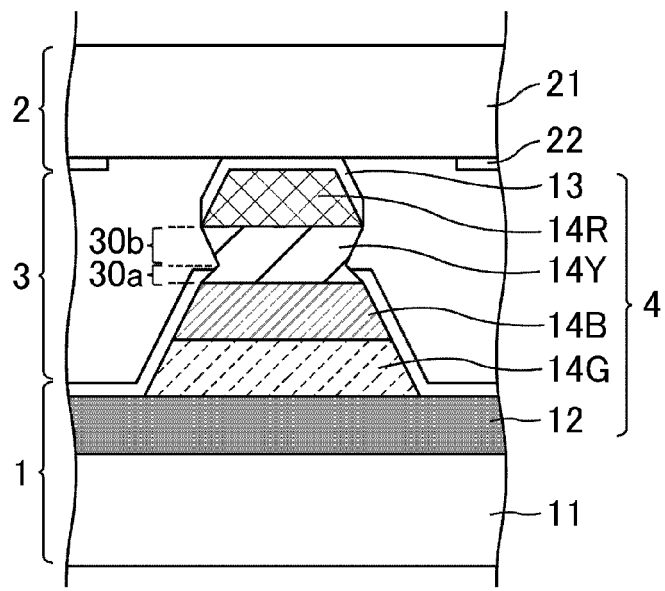
FIG. 11 is a schematic cross-sectional view of a spacer portion of a liquid crystal display device of Embodiment 3.

FIG. 11 is a schematic cross-sectional view of a spacer portion of an LCD device of Embodiment 3. As shown in FIG. 11, the LCD device of Embodiment 3 has a configuration where a liquid crystal layer 3 is disposed between a color filter substrate 1 and an array substrate 2, and a multi-layer spacer 4 is disposed between the color filter substrate 1 and the array substrate 2 as a member for fixing a distance (cell gap) therebetween. The multi-layer spacer 4 is formed in a color-filter-substrate 1.

The multi-layer spacer 4 in Embodiment 3 includes a black matrix (light shielding layer) 12, a green color filter (colored transparent layer) 14G, a blue color filter (colored transparent layer) 14B, a yellow color filter (colored transparent layer) 14Y, a red color filter (colored transparent layer) 14R, and a common electrode 13, which are stacked in this order when viewed from an insulating substrate 11. Accordingly, in Embodiment 1, the common electrode 13 is disposed at a place upper than the color filters disposed in a stack.

FIG. 11 shows an embodiment in which the yellow color filter 14Y of the color filters included in a multi-layer spacer has a reverse tapered shape. Unlike the configuration of Embodiment 1, the yellow color filter 14Y has a forward tapered portion 30a and a reverse tapered portion 30b. The portion 30b with a reverse tapered shape is located at a place upper than the portion 30a with a forward tapered shape. The yellow color filter 14Y with such a shape has a reverse tapered shape in which an upper surface covers a lower surface, which achieves disconnection of a common electrode.

When adhesion of the yellow color filter 14Y included in the multi-layer spacer is low, the width (area) of the lower surface of the color filter 14Y may need to be increased. In such a case, the color filter 14Y may not be formed in an exact reverse tapered shape. Embodiment 3 is particularly preferably applied to such a case.

Figure 12:
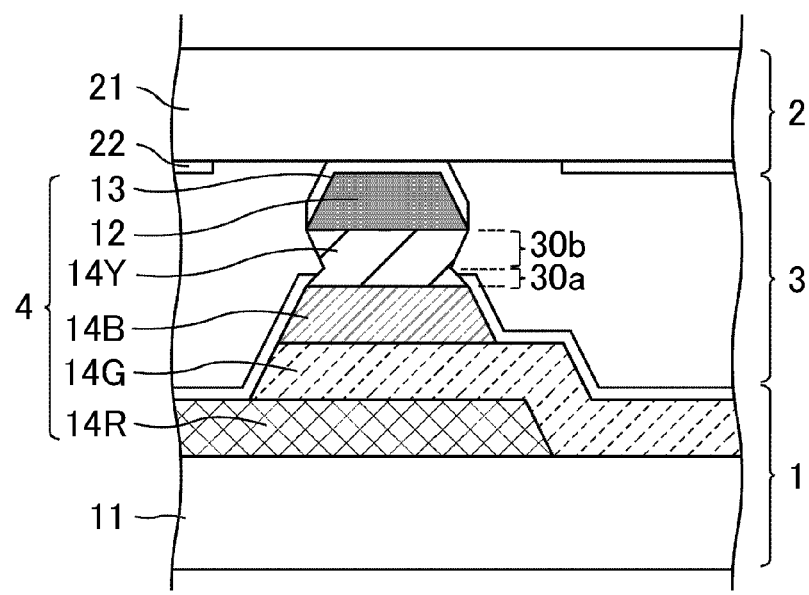
FIG. 12 is a schematic cross-sectional view of a spacer portion of a variation of the liquid crystal display device of Embodiment 3.

Since all of the features of Embodiment 1 and Embodiment 2 may be applied to Embodiment 3, a black matrix may be formed after or before the formation of the color filters. FIG. 11 shows an embodiment in which the black matrix is formed before the formation of the color filters. FIG. 12 shows an embodiment in which the black matrix is formed after the formation of the color filters. FIG. 12 is a schematic cross-sectional view of a spacer portion of a variation of the LCD device of Embodiment 3.

In Embodiment 3, the number of color filters including a portion with a reverse tapered shape and a portion with a forward tapered shape is not particularly limited. The more color filters the spacer includes, the higher the possibility of disconnection a common electrode is. In Embodiment 3, a multi-layer spacer may include both a color filter having a reverse tapered shape and a color filter including a portion with a reverse tapered shape and a portion with a forward tapered shape.

The present application claims priority to Patent Application No. 2009-238465 filed in Japan on Oct. 15, 2009 under the Paris Convention and provisions of national law in a designated State, the entire contents of which are hereby incorporated by reference.

EXPLANATION OF NUMERALS AND SYMBOLS

1: Color filter substrate
2: Array substrate
3: Liquid crystal layer
4: Multi-layer spacer
11, 21: Insulating substrate
12: Black matrix (light-shielding layer)

13: Common electrode
14R: Red color filter (colored transparent layer)
14G: Green color filter (colored transparent layer)
14B: Blue color filter (colored transparent layer)
14Y: Yellow color filter (colored transparent layer)
22: Pixel electrode
30a: Forward tapered portion
30b: Reverse tapered portion

The invention claimed is:

1. A color filter substrate, comprising:
colored transparent layers disposed side by side; and
colored transparent layers disposed in a stack,
wherein an electrode is disposed at a place upper than the colored transparent layers disposed side by side and an electrode is disposed at a place upper than the colored transparent layers disposed in a stack,
the colored transparent layers disposed in a stack include a colored transparent layer having a reverse tapered shape, and
the uppermost layer of the colored transparent layers disposed in a stack has a forward tapered shape.

2. The color filter substrate according to claim 1,
wherein, of the colored transparent layers disposed in a stack, colored transparent layers other than the uppermost layer each have a reverse tapered shape.

3. A color filter substrate, comprising:
colored transparent layers disposed side by side; and
colored transparent layers disposed in a stack,
wherein an electrode is disposed at a place upper than the colored transparent layers disposed side by side and an electrode is disposed at a place upper than the colored transparent layers disposed in a stack,
the colored transparent layers disposed in a stack include a colored transparent layer having a reverse tapered shape, and
a light shielding layer having a forward tapered shape is disposed at a place upper than the colored transparent layers disposed in a stack.

4. The color filter substrate according to claim 3,
wherein each of the colored transparent layers disposed in a stack has a reverse tapered shape.

5. The color filter substrate according to claim 1,
wherein the colored transparent layers disposed side by side are arranged in a stripe pattern.

6. The color filter substrate according to claim 1,
wherein the colored transparent layers disposed side by side are arranged in a dot pattern.

7. The color filter substrate according to claim 1,
wherein the colored transparent layer having a reverse tapered shape contains an ultraviolet absorption material.

8. The color filter substrate according to claim 1,
wherein the colored transparent layer having a reverse tapered shape includes a reverse tapered portion and a forward tapered portion, the reverse tapered portion being located at a place upper than the forward tapered portion.

9. A liquid crystal display device, comprising:
a color filter substrate according to claim 1;
a counter substrate; and
a liquid crystal layer disposed between the color filter substrate and the counter substrate.

10. The liquid crystal display device according to claim 9,
wherein the colored transparent layers disposed side by side constitute a display portion of the liquid crystal display device, and the colored transparent layers disposed in a stack constitute a spacer portion of the liquid crystal display device.

* * * * *